(12) United States Patent
Wang et al.

(10) Patent No.: US 11,500,499 B2
(45) Date of Patent: Nov. 15, 2022

(54) DISPLAY PANEL AND ITS FABRICATION METHOD, AND DISPLAY DEVICE

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Qingxia Wang, Shanghai (CN); Ruiqi Huang, Shanghai (CN)

(73) Assignees: Wuhan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/217,317

(22) Filed: Mar. 30, 2021

(65) Prior Publication Data
US 2022/0206634 A1   Jun. 30, 2022

(30) Foreign Application Priority Data
Dec. 28, 2020   (CN) .................. C202011581326.X

(51) Int. Cl.
*G06F 3/044*   (2006.01)
(52) U.S. Cl.
CPC .......... *G06F 3/0446* (2019.05); *G06F 3/0443* (2019.05); *G06F 2203/04103* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 9,104,274 B2 * | 8/2015 | Kim ................. | G06F 3/0446 |
| 2018/0373367 A1 * | 12/2018 | Wang ................ | G06F 3/0446 |
| 2021/0405824 A1 * | 12/2021 | Wang ................ | G06F 3/0446 |

FOREIGN PATENT DOCUMENTS

CN          106155388 A        11/2016

\* cited by examiner

*Primary Examiner* — Duane N Taylor, Jr.
(74) *Attorney, Agent, or Firm* — Anova Law Group, PLLC

(57) ABSTRACT

A display panel and its fabrication method are provided. The display panel includes a display function layer and a touch control function layer. The touch control function layer includes a bridge connection layer with a bridge electrode, an insulating layer, and a touch control electrode layer disposed sequentially on a light-exiting side of the display function layer. The touch control electrode layer includes first touch control electrodes and second touch control electrodes insulated from each other. Each first touch control electrode includes first electrode units electrically connected to each other. Each second touch control electrode includes second electrode units electrically connected to each other. Two adjacent first electrode units are connected to each other through the bridge electrode. The bridge electrode includes a first edge, a second edge, and a deformation unit including a first deformation part and a second deformation part.

16 Claims, 12 Drawing Sheets

DISPLAY PANEL AND ITS FABRICATION METHOD, AND DISPLAY DEVICE

CROSS-REFERENCES TO RELATED APPLICATION

This application claims the priority of Chinese Patent Application No. 202011581326.X, filed on Dec. 28, 2020, the content of which is incorporated herein by reference in its entirety.

TECHNICAL FIELD

The present disclosure generally relates to the field of electronic products and, more particularly, relates to a display panel and its fabrication method, and a display device.

BACKGROUND

In recent years, the application of touch control technology on display devices of various sizes has become more and more widespread. Touch control display panels are used as a new type of display panels for human-computer interaction input. In comparison with conventional display devices and input with keyboards and mice, input on the touch control display panels is simpler, more direct and convenient.

To achieve a touch control function of a display device, touch control electrodes are needed to be provided in the display device, and different touch control electrodes are insulated from each other. In one technical method, a touch control circuit is formed at a surface of a display panel, and no bonding process is necessary. However, for process reasons, a short circuit or open circuit is likely to occur at a bridge position of electrode connections. The reliability of the display device may be affected.

Therefore, there is a need for a display panel, a fabrication method of a display panel and a display device with improved reliability.

SUMMARY

One aspect of the present disclosure provides a display panel. The display panel includes a display function layer and a touch control function layer. The touch control function layer includes a bridge connection layer, an insulating layer, and a touch control electrode layer disposed sequentially on a light-exiting side of the display function layer. The bridge connection layer includes at least one bridge electrode. The touch control electrode layer includes a plurality of first touch control electrodes and a plurality of second touch control electrodes. The plurality of first touch control electrodes and the plurality of second touch control electrode are insulated from each other. Each of the plurality of first touch control electrodes includes a plurality of first electrode units electrically connected to each other and disposed along a first direction. Each of the plurality of second touch control electrodes includes a plurality of second electrode units electrically connected to each other and disposed along a second direction. The first direction X intersects the second direction. In a same first touch control electrode of the plurality of first touch control electrodes, any two adjacent first electrode units of the plurality of first electrode units are connected to each other through the at least one bridge electrode. An orthographic projection of the at least one bridge electrode on the display function layer has a first edge and a second edge opposite to each other. At least one deformation unit is disposed at the first edge and the second edge. The at least one deformation unit includes at least one first deformation part and at least one second deformation part. The at least one first deformation part is disposed at the first edge and the second at least one deformation part is disposed at the second edge. Each of the at least one first deformation part and the at least one second deformation part includes at least one edge tangent line intersecting an extending direction of the at least one bridge electrode.

Another aspect of the present disclosure provides a fabrication method of a display panel. The method includes: providing a display function layer; forming a bridge connection layer wherein the bridge connection layer covers the display function layer; coating the bridge connection layer with a photoresist and patterning the photoresist; etching the bridge connection layer using the patterned photoresist as an etch mask to form at least one bridge electrode; removing the photoresist; forming an insulating layer on a side of the bridge connection layer away from the display function layer; and forming a touch control function layer on a side of the insulating layer away from the display function layer. An orthographic projection of one of the at least one bridge electrode on the display function layer has a first edge and a second edge opposite to each other. At least one deformation unit is disposed at the first edge and the second edge. The at least one deformation unit includes at least one first deformation part and at least one second deformation part. The at least one first deformation part is disposed at the first edge and the at least one second deformation part is disposed at the second edge. Each of the at least one first deformation part and the at least one second deformation part includes at least one edge tangent line intersecting an extending direction of the at least one bridge.

Another aspect of the present disclosure provides a display device. The display device includes a display panel. The display panel includes a display function layer and a touch control function layer. The touch control function layer includes a bridge connection layer, an insulating layer, and a touch control electrode layer disposed sequentially on a light-exiting side of the display function layer. The bridge connection layer includes at least one bridge electrode. The touch control electrode layer includes a plurality of first touch control electrodes and a plurality of second touch control electrodes. The plurality of first touch control electrodes and the plurality of second touch control electrode are insulated from each other. Each of the plurality of first touch control electrodes includes a plurality of first electrode units electrically connected to each other and disposed along a first direction. Each of the plurality of second touch control electrodes includes a plurality of second electrode units electrically connected to each other and disposed along a second direction. The first direction intersects the second direction. In a same first touch control electrode of the plurality of first touch control electrodes, any two adjacent first electrode units of the plurality of first electrode units are connected to each other through the at least one bridge electrode. An orthographic projection of the at least one bridge electrode on the display function layer has a first edge and a second edge opposite to each other. At least one deformation unit is disposed at the first edge and the second edge. The at least one deformation unit includes at least one first deformation part and at least one second deformation part. The at least one first deformation part is disposed at the first edge and the second at least one deformation part is disposed at the second edge. Each of the at least one first deformation part and the at least one second deformation part includes at least one edge tangent line intersecting an extending direction of the at least one bridge electrode.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
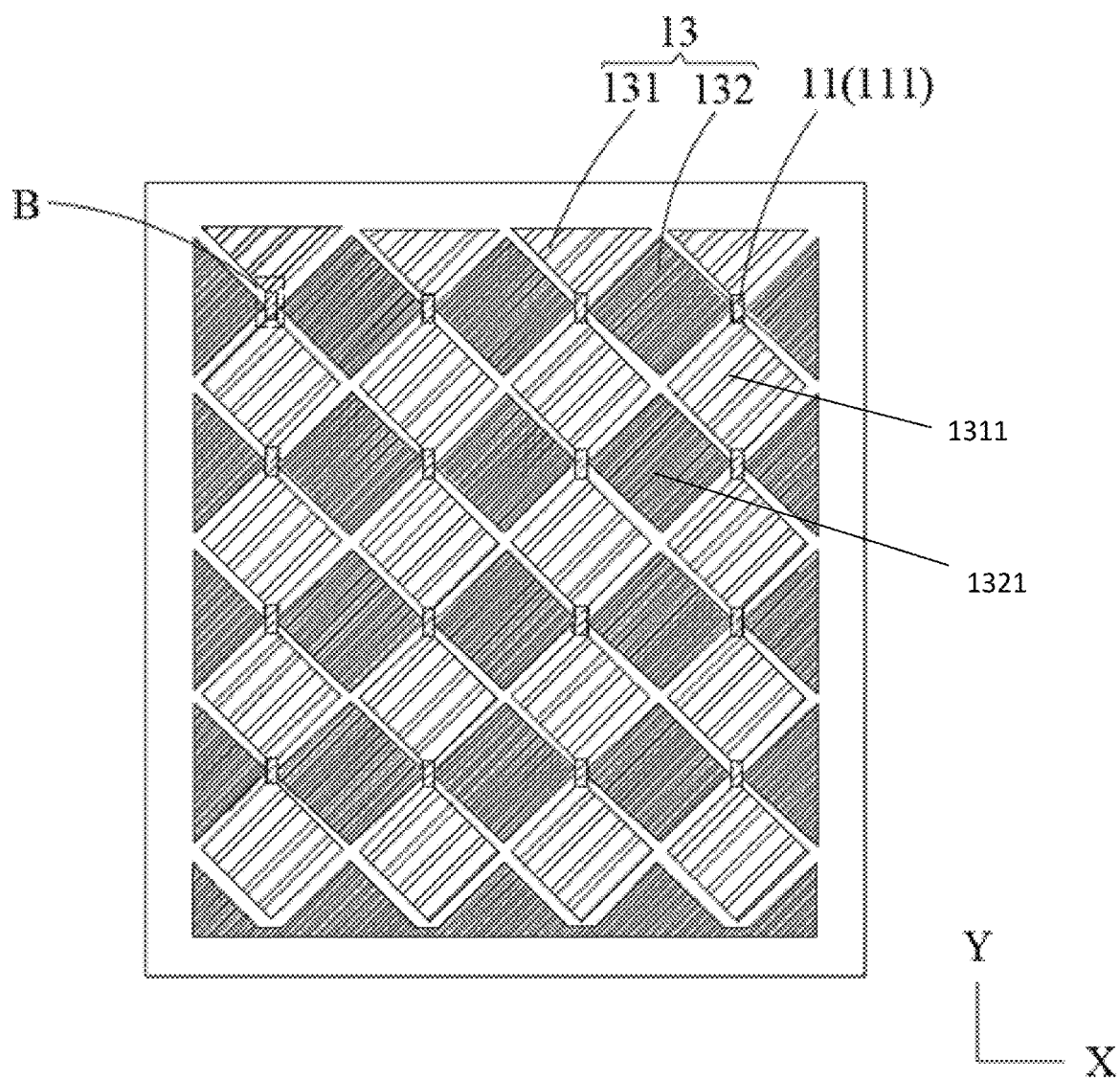
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

One embodiment of the present disclosure provides a display panel. As illustrated in FIG. 1 to FIG. 6, the display panel may include a display function layer 2 and a touch control function layer 1. The touch control function layer 1 may include bridge connection layers 11, an insulating layer 12, and a touch control electrode layer 13 disposed sequentially on a light-exiting side of the display function layer 2. Each bridge connection layer 11 may include at least one bridge electrode 111. The touch control electrode layer 13 may include a plurality of first touch control electrodes 131 and a plurality of second touch control electrodes 132. The plurality of first touch control electrodes 131 and the plurality of second touch control electrodes 132 may be insulated from each other. Each of the plurality of first touch control electrodes 131 may include a plurality of first electrode units 1311 electrically connected to each other and disposed along a first direction X. Each of the plurality of second touch control electrodes 132 may include a plurality of second electrode units 1321 electrically connected to each other and disposed along a second direction Y. The first direction X may intersect the second direction Y. In a first touch control electrode 131 of the plurality of first touch control electrodes 131, any two adjacent first electrode units of the plurality of first electrode units 1311 may be electrically connected to each other through a corresponding bridge electrode 111 of the at least one bridge electrode 111. An orthographic projection of the bridge electrode 111 on the display function layer 2 may have a first edge e1 and a second edge e2 opposite to each other. At least one deformation unit 4 may be disposed at the first edge e1 and the second edge e2. The at least one deformation unit 4 may at least include a first deformation part 41 and a second deformation part 42. The first deformation part 41 may be disposed at the first edge e1 and the second deformation part 42 may be disposed at the second edge e2. Each of the first deformation part 41 and the second deformation part 42 may have at least one edge tangent line intersecting an extending direction of the at least one bridge electrode 111.

In the present disclosure, the display panel may include the display function layer 2 and the touch control function layer 1. The touch control function layer 1 may include the bridge connection layers 11, the insulating layer 12, and the touch control electrode layer 13. Each bridge connection layer 11 may include the at least one bridge electrode 111 for electrically connecting two adjacent first electrode units of the plurality of first electrode units in the touch control electrode layer 13, to prevent the short circuit between the plurality of first electrode units and the plurality of second electrode units. The orthographic projection of one of the at least one bridge electrode 111 on the display function layer 2 may have the first edge e1 and the second edge e2 opposite to each other. The at least one deformation unit 4 may be disposed at the first edge e1 and the second edge e2. In the at least one deformation unit 4, the first deformation part 41 may be disposed at the first edge e1 and the second deformation part 42 may be disposed at the second edge e2. When form the first deformation part 41 and the second deformation part 42 by a process including etching, a process including etching may be performed from different directions on the first edge e1 and the second edge e2 of the at least one bridge electrode 111. An edge slope (a taper angle) of the one of the at least one bridge electrode 111 may be relatively gentle, preventing the short circuit between the plurality of first touch control electrodes 131 and the plurality of second touch control electrodes 132 in the touch control electrode layer 13 at edge positions of the at least one bridge electrode 111 induced by etching residue. Further, the insulating layer 12 may be prevented from being broken down because of a large edge slope of the at least one bridge electrode 111. Correspondingly, breaking down and an open circuit of the plurality of first touch control electrodes 131 or the plurality of second touch control electrodes 132 in the touch control electrode layer 13 may be prevented. Uniformity of the film formation of the insulating layer 121 at the edge slopes of the at least one bridge electrode 111, and the reliability of the display panel in electrostatic discharge verification, may be improved.

Figure 2:
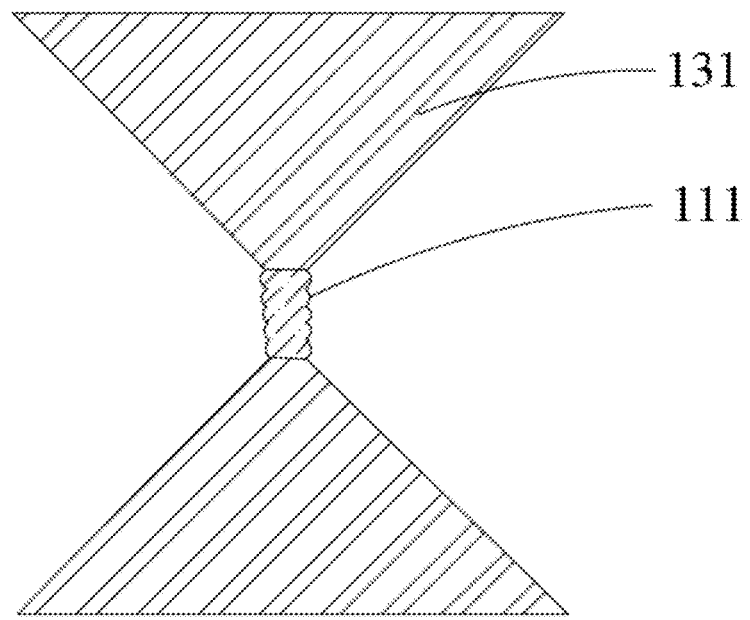
FIG. 2 illustrates an enlarged view of part B in the display panel in FIG. 1 consistent with various disclosed embodiments in the present disclosure.
Figure 3:
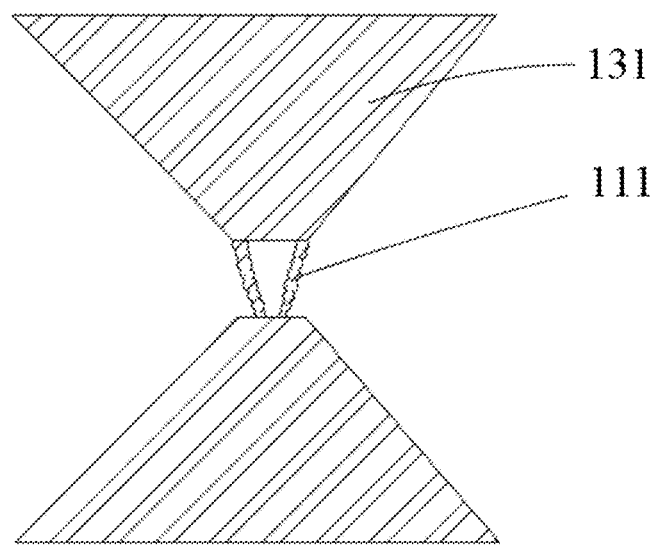
FIG. 3 illustrates connections of an exemplary bridge electrode consistent with various disclosed embodiments in the present disclosure.
Figure 4:
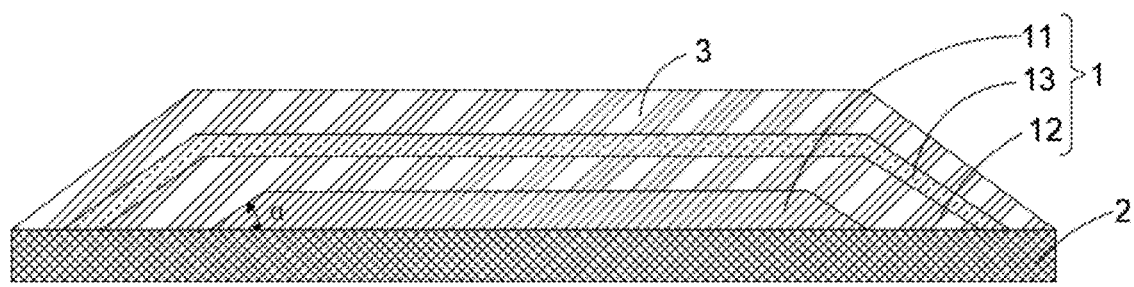
FIG. 4 illustrates a film layer structure of an exemplary display panel consistent with various disclosed embodiments in the present disclosure.

In one embodiment illustrated in FIG. 2, the first electrode units in the two adjacent first touch control electrodes 131 in FIG. 2 may be connected by a corresponding bridge electrode 111 of the at least one bridge electrode 111. In another embodiment illustrated in FIG. 3, the first electrode units in the two adjacent first touch control electrodes 131 may be connected by two bridge electrode 111 of the at least one bridge electrode 111, to prevent the display panel from being not able to operate normally when one of the at least one bridge electrode 111 is broken. The above embodiments are used as examples to illustrate the present disclosure only, and do not limit the scope of the present disclosure. In various embodiments, a number of the at least one bridge electrode 111 is not limited and can be configured according to shape and size of the first electrode units of the plurality of first touch control electrode 131.

Figure 5:
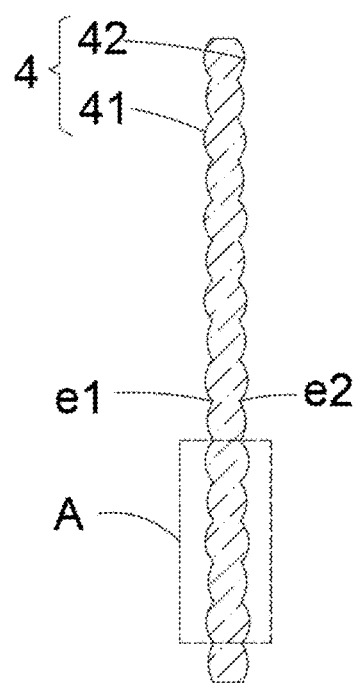
FIG. 5 illustrates a top view of an exemplary bridge electrode consistent with various disclosed embodiments in the present disclosure.

As illustrated in FIG. 5, when forming the bridge connection layers 11, the at least one deformation unit 4 may be formed by etching on the two side edges of the at least one bridge electrode 111, that is, on the first edge e1 and the second edge e2. Specifically, the at least one bridge electrode 111 may be etched by a dry etching process or a wet etching process. Each of the first deformation part 41 and the second deformation part 42 may have at least one edge tangent line intersecting an extending direction of the at least one bridge electrode 111. When etching the first edge e1 and the second edge e2 of the at least one bridge electrode 111 by the dry etching process or the wet etching process, the edges of the at least one bridge electrode 111 may be etched from all directions, to make the edge slope of the at least one bridge electrode 111 relatively gentle. Etching residue when forming the touch control function layer 1 may be reduced to prevent short circuits.

To avoid change of a capacitance between the control driving electrodes and touch control sensing electrodes induced by the display function layer 2, the at least one bridge electrode 11 may be disposed at a metal layer close to the display function layer 2, and the control driving electrodes and touch control sensing electrodes may be disposed at a metal layer of the at least one bridge electrode 111 away from the display function layer 2. Optionally, in some embodiments, a side of the touch control function layer 1 away from the display function layer 2 may be covered by an inorganic packaging layer 3 to protect the touch control function layer. The inorganic packaging layer 3 may be made of an inorganic material including SiN or $SiO_2$.

The plurality of first touch control electrodes 131 and the plurality of second touch control electrodes 132 may be disposed in a same layer and insulated from each other. The bridge connection layers 11 may be provided to electrically connect the plurality of first electrode units and guarantee that the electrical connection between the plurality of first electrode units is not broke by the plurality of second electrode units. Specifically, the at least one bridge electrode 111 in one bridge connection layer may be used to cross one corresponding second electrode unit between corresponding two adjacent first electrode units to connect the corresponding two adjacent first electrode units. Correspondingly, the plurality of first touch control electrodes 131 and the plurality of second touch control electrodes 132 disposed in a same layer and insulated from each other may be achieved, to guarantee the touch control performance. Specifically, the display panel may generate touch control information according to change of the capacitance between the plurality of first touch control electrodes 131 and the plurality of second touch control electrodes 132, to achieve the touch control function.

The plurality of first electrode units may be disposed along the first direction X, and the plurality of second electrode units may be disposed along the second direction Y. The first direction X may be perpendicular to the second direction Y, that is, the arrangement direction of the plurality of first electrode units may be perpendicular to the arrangement direction of the plurality of second electrode units, to improve the uniformity of the touch control performance of the display panel along the first direction X and the second direction Y. In some other embodiments, a relative angle between the first direction X and the second direction Y may be configured to be other suitable angles as long as the touch control performance of the display panel is guaranteed.

The at least one deformation unit 4 may be disposed at the first edge e1 and the second edge e2. Each deformation unit 4 of the at least one deformation unit 4 may include the first deformation part 41 and the second deformation part 42. That is, a plurality of deformation units 4 may be disposed at intervals along an extending direction of the at least one bridge electrode 111 at the first edge e1 and the second edge e2. Correspondingly, the plurality of first deformation parts 41 and the plurality of second deformation parts 42 may be disposed at the first edge e1 and the second edge e2 of the at least one bridge electrode 111 respectively, to reduce the taper angle of the edges of the formed at least one bridge electrode 111. The first deformation part 41 and the second deformation part 42 may be formed by recesses or protrusions. The specific shape of first deformation part 41 and the second deformation part 42 may be semicircular, trapezoidal, or rectangular, and may be configured according to size of the at least one bridge electrode 111 and the forming difficulty.

Since the at least one deformation unit 4 may be provided on the edges of the at least one bridge electrode 111, when human eyes observe the at least one bridge electrode 111, parallel light beams may be diffusely reflected on the at least one bridge electrode 111 at the same time. Because of the difference in the distance between the various positions of the at least one deforming unit 4 and the human eyes, the difference in the distance may also cause a difference in the intensity of the reflected light reaching the human eyes. Therefore, when the human eyes observe the at least one bridge electrode 111 at the same angle, the human eyes may not observe the at least one bridge electrode 111 completely. Recognition of the bridge electrode 111 by human eyes can be reduced.

In some embodiments, to reduce the edge slope of the at least one bridge electrode, the at least one bridge electrode 111 may have a trapezoidal shape on a plane along a thickness direction of the display panel, and a bottom angle α of the trapezoidal shape of the at least one bridge electrode 111 may be about 20° to about 45°. As illustrated in FIG. 1, a cross section of the at least one bridge electrode along the thickness direction of the display panel may be trapezoidal, for example, may be an isosceles trapezoid. Correspondingly, the stability when the at least one bridge electrode connects the plurality of first electrode units may be improved, and the at least one bridge electrode may be less likely to be deformation. The bottom angle α of the at least one bridge electrode 111 may be about 20° to about 45°. In one embodiment, the bottom angle α may be the taper angle. The bottom angle α of the at least one bridge electrode 111 should not be too large. When the bottom angle is too large, the insulating layer 12 on the at least one bridge electrode may be broken down easily, and short circuits or open circuits may happen in the plurality of first touch control electrodes 131 or the plurality of second touch control electrodes 132. The bottom angle α of the at least one bridge electrode 111 should not be too small. When the bottom angle is too small, an area occupied by the at least one bridge electrode may be too large, affecting the layout of other lines or portions of the display panel. Further, a small bottom angle may also reduce a height of the at least one bridge electrode, affecting connection between the adjacent first electrode units through the at least one bridge electrode. The above embodiments are only used as examples to illustrate the present disclosure and do not limit the scope of the present disclosure. In various embodiments, the cross section of the at least one bridge electrode 111 and the bottom angle may have any suitable form. For example, in one embodiment, the cross section of the at least one bridge electrode 111 may be a truncated circle.

Figure 7:
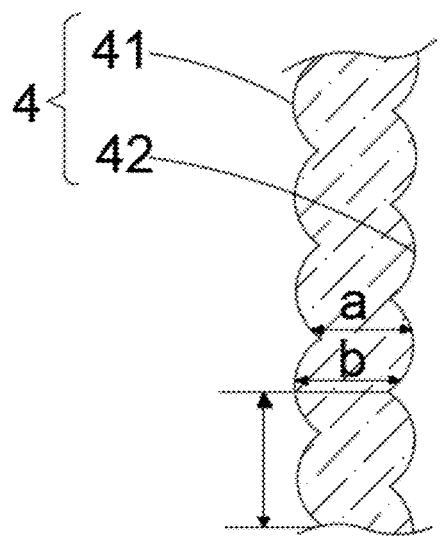
FIG. 7 illustrates a top view of another exemplary bridge electrode consistent with various disclosed embodiments in the present disclosure.
Figure 8:
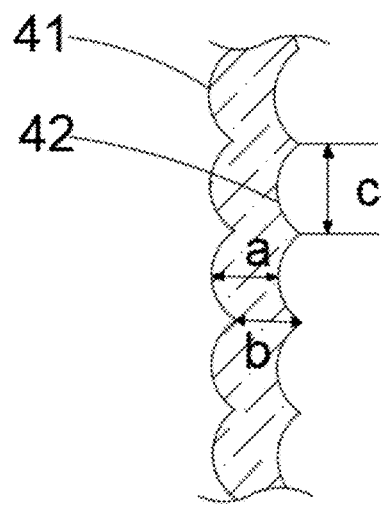
FIG. 8 illustrates a top view of another exemplary bridge electrode consistent with various disclosed embodiments in the present disclosure.
Figure 9:
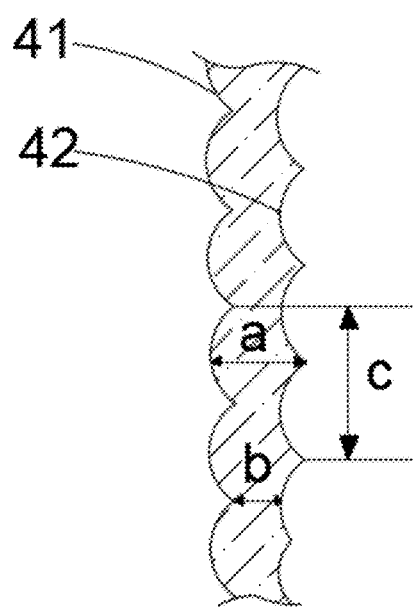
FIG. 9 illustrates a top view of another exemplary bridge electrode consistent with various disclosed embodiments in the present disclosure.

In some embodiments, as illustrated in FIG. 7 to FIG. 9, one of the first deformation part 41 and the second deformation part 42 may be a protrusion structure, and another of the first deformation part 41 and the second deformation part 42 may be a recession structure. Specifically, in one embodiment illustrated in FIG. 8 and FIG. 9, the first deformation part 41 at the first edge e1 may be configured to be a protrusion structure, and the second deformation part 42 at the second edge e2 may be configured to be a recession structure. The first deformation part 41 and the second deformation part 42 may have different structures. In another embodiment, the first deformation part 41 at the first edge e1 may be configured to be a recession structure, and the second deformation part 42 at the second edge e2 may be configured to be a protrusion structure. Two side edges of the at least one bridge electrode 111 may be provided with the protrusion structure and the recessions structure respectively, to achieve patterning process on the edges of the at least one bridge electrode 111. It may be ensured that the edges of the at least one bridge electrode 111 can be etched along all directions instead of that the edges of the at least one bridge electrode 111 can only be etched along the extension direction of the at least one bridge electrode 111. By etching the edges of the at least one bridge electrode 111 along all directions, the edge slope of the at least one bridge electrode 111 may be reduced after etching.

In some other embodiments, the first deformation part 41 and the second deformation part 42 may have a same structure for easy formation. For example, in one embodiment illustrated in FIG. 7, both the first deformation part 41 and the second deformation part 42 may be the protrusion structure. In another embodiment illustrated in FIG. 12 and FIG. 13, the first deformation part 41 and the second deformation part 42 may both be the recession structure.

In one embodiment, the edges of the at least one bridge electrode 111 may protrude toward a direction perpendicular to the extension direction of the at least one bridge electrode to form the protrusion structure. Also the edges of the at least one bridge electrode 111 may be recessed toward a direction perpendicular to the extension direction of the at least one bridge electrode to form the recession structure. For description purposes only, this embodiment is used as an example to illustrate the present disclosure and should not limit the scope of the present disclosure. In various embodiments, the protrusion direction or the recession direction of the first deformation part 41 and the second deformation part 41 may be not limit to a direction perpendicular to the extension direction of the at least one bridge electrode 111, as long as the protrusion direction or the recession direction of the first deformation part 41 and the second deformation part 41 intersect the extension direction of the at least one bridge electrode 111.

Extension length of the protrusion structure and the recession structure should not be too large, to prevent structure strength of the at least one bridge electrode 111 from being affected by the protrusion structure and the recession structure. When the protrusion structure is too long, the protrusions structure may break and fall off directly from the at least one bridge electrode 111. When the extension length of the recession structure is too large, the at least one bridge electrode 111 as a whole may break at the recession structure, affecting the reliability of the display panel.

In various embodiments illustrated in FIG. 5 to FIG. 15, relative position of the first deformation part 41 and the second deformation part 42 may be configured in various suitable forms. In some embodiments illustrated in FIG. 5, FIG. 6, FIG. 8, FIG. 10 and FIG. 12, the first deformation part 41 and the second deformation part 42 may be opposite to each other along a direction perpendicular to the extension direction of the at least one bridge electrode 111. In some other embodiments illustrated in FIG. 7, FIG. 9, FIG. 11, and FIG. 13, the first deformation part 41 and the second deformation part 42 may be arranged in a staggered manner.

When the first deformation part 41 and the second deformation part 42 are disposed oppositely, the first deformation part 41 and the second deformation part 42 may be use a same structure. For example, in one embodiment, both the first deformation part 41 and the second deformation part 42 may adopt a protrusion structure or a recession structure, which is easy to form, in the at least one bridge electrode 111 shown in FIG. 6, FIG. 10 or FIG. 12. In some other embodiments, the first deformation part 41 and the second deformation part 42 can also adopt different structures to increase the irregularity of the edges of the at least one bridge electrode 111, in the at least one bridge electrode 111 shown in FIG. 8 and FIG. 9. Alternatively, in some other embodiments, in the direction perpendicular to the extending direction of the at least one bridge electrode 111, the first deformation part 41 and the second deformation part 42 may also be arranged in a staggered manner, that is, there may be a certain amount of dislocation between the first deformation part 41 and the second deformation part 42. The specific shape and structure of the first deformation part 41 and the second deformation part 42 are not particularly limited, and at least one of a protrusion structure or a recession structure can be selected.

Figure 6:
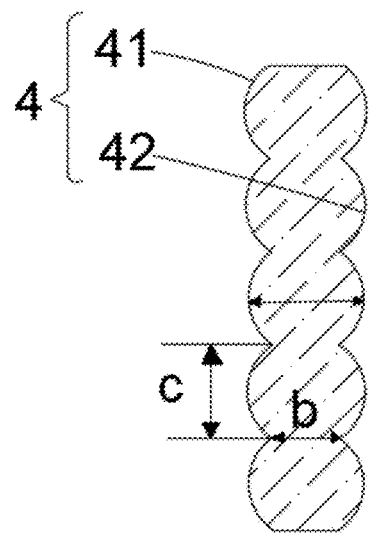
FIG. 6 illustrates an enlarged view of part A in the bridge electrode in FIG. 5 consistent with various disclosed embodiments in the present disclosure.
Figure 12:
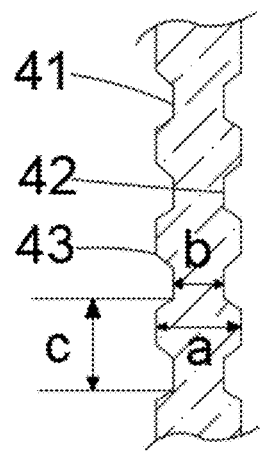
FIG. 12 illustrates a top view of another exemplary bridge electrode consistent with various disclosed embodiments in the present disclosure.

As illustrated in FIG. 6 and FIG. 12, in some embodiments, edge shapes of the orthographic projection of the first deformation part 41 and the second deformation part 42 on the touch control electrode layer 13 may be at least one of a circle, a polygon, an arc, or at least one of combined graphics of a circle, a polygon, or arc.

The first deformation part 41 and the second deformation part 42 may specifically be trapezoidal, semicircular, or rectangular shapes that are convex outward or concave inward, or combined shapes of circles, polygons, and arcs including various irregular shapes, as long as the patterned irregular shapes are formed on the first edge e1 and the second edge e2 of the at least one bridge electrode 111 to ensure that the edges of the bridge electrode 111 can be etched in all directions and the edge slope of the bridge electrode 111 after etching can be reduced after etching.

To facilitate the formation of the at least one bridge electrode 111 and the connection of the plurality of first electrode units, in some embodiments, the edge shapes of the orthographic projection of the first deformation part 41 and the second deformation part 42 on the touch control electrode layer 13 may be same. Specifically, the first deformation part 41 and the second deformation part 42 may both adopt a structure including a circular arc structure or a trapezoidal structure that is convex in the direction perpendicular to the extension direction of the at least one bridge electrode 111, or a structure including a circular arc structure or a trapezoidal structure that is concave in the direction perpendicular to the extension direction of the at least one bridge electrode 111.

As illustrated in FIG. 10 to FIG. 12 and FIG. 15, in some embodiments, a flat part 43 may be disposed between two adjacent first deformation parts 41 and/or two adjacent second deformation parts 42. An edge tangent of the flat part 43 may be parallel to the extending direction of the at least one bridge electrode 111.

In some embodiments, the edge tangent of the flat part 43 may be parallel to the extending direction of the at least one bridge electrode 111, that is, the flat part 43 may be a portion of the edge of the at least one bridge electrode 111 not being etched. Specifically, an orthographic projection of the at least one bridge electrode 111 on the touch control electrode layer 13 may be a strip, and the flat part 43 may be a portion of the edge of the at least one bridge electrode 111 not being etched. The flat part 43 may prevent sharp corners from forming between two adjacent first deformation parts 41 and/or two adjacent second deformation parts 42 since the sharp corners may be easily broken to affect normal use of the at least one bridge electrode 111.

In some other embodiments, the flat part 43 may be formed by etching. The deformation units 4 and flat parts 43 located between the adjacent deformation units 4 are formed together by etching. According to actual needs, the flat parts 43 may only be formed between the adjacent first deformation parts 41, or only be formed between the adjacent second deformation parts 42, or may be formed both between the adjacent first deformation parts 41 and between the adjacent second deformation parts 42.

In some embodiments, along the direction perpendicular to the extending direction of the at least one bridge electrode 111, a maximum width between the first edge 31 and the second edge e2 may be a, and a minimum width between the first edge 31 and the second edge e2 may be b, with a≥b.

Since the first deformation part 41 may be disposed at the first edge e1 and the second deformation part 42 may be disposed at the second edge e2, distance between the first edge 31 and the second edge e2 may not be constant everywhere. A maximum width between the first edge 31 and the second edge e2 may be a, and a minimum between the first edge 31 and the second edge e2 may be b. When a=b, the first deformation part 41 at the first edge e1 and the second deformation part 42 at the second edge e2 may be staggered. When a>b, the first deformation part 41 at the first edge e1 and the second deformation part 42 at the second edge e2 may be directly opposite to each other.

In some embodiments, along the extending direction of the at least one bridge electrode 111, a length of one of the deformation unit 4 may be c with 10 μm≥c≥5 μm.

One of the deformation unit 4 may include one first deformation part 41 at the first edge e1 and one second deformation part 42 at the second edge e2. A length c of the deformation unit 4 may be the maximum distance between the first deformation part 41 and the second deformation part 42, or a length of the first deformation part 41 and the second deformation part 42. Specifically, when the first deformation part 41 and the second deformation part 42 are same and directly opposite to each other, the length c of the deformation unit 4 may be the length of the first deformation part 41 and the second deformation part 42 along the extending direction of the at least one bridge electrode 111. When the first deformation part 41 at the first edge e1 and the second deformation part 42 at the second edge e2 are staggered, the length c of the deformation unit 4 may be the maximum distance between the first deformation part 41 and the second deformation part 42 along the extending direction of the at least one bridge electrode 111. The length c of the deformation unit 4 may be configured to 10 μm≥c≥5 μm, to facilitate the formation of the deformation units 4 at the at least one bridge electrode 111.

As illustrated in FIG. 6, FIG. 8, FIG. 10, and FIG. 12, in some embodiments, when a>b, the first deformation part 41 at the first edge e1 and the second deformation part 42 at the second edge e2 may be disposed oppositely along the direction perpendicular to the extending direction of the at least one bridge electrode 111, and 5 µm≥a−b≥0.5 µm.

When the first deformation part 41 at the first edge e1 and the second deformation part 42 at the second edge e2 have the same structure, a maximum distance between the first deformation part 41 and the second deformation part 42 may be a and a minimum distance between the first deformation part 41 and the second deformation part 42 may be b. A condition 5 µm≥a−b≥0.5 µm may be satisfied to facilitate production because of the limitation of the process.

Figure 11:
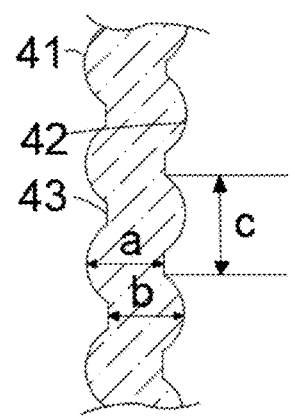
FIG. 11 illustrates a top view of another exemplary bridge electrode consistent with various disclosed embodiments in the present disclosure.
Figure 13:
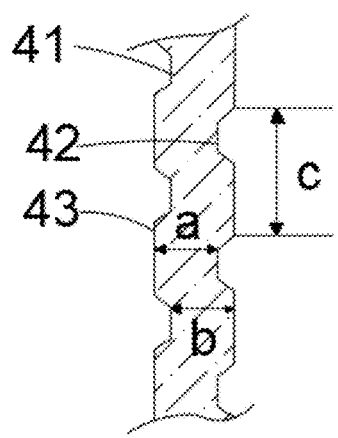
FIG. 13 illustrates a top view of another exemplary bridge electrode consistent with various disclosed embodiments in the present disclosure.

As illustrated in FIG. 7, FIG. 11, and FIG. 13, in some embodiments, the first deformation part 41 at the first edge e1 and the second deformation part 42 at the second edge e2 may be staggered along the direction perpendicular to the extending direction of the at least one bridge electrode 111, and 10 µm≥a−b≥3.5 µm.

When the maximum width a between the first edge 31 and the second edge e2 is equal to the minimum b between the first edge 31 and the second edge e2, the first deformation part 41 at the first edge e1 and the second deformation part 42 at the second edge e2 may be staggered, such that the maximum distance between the first deformation part 41 and the second deformation part 42 is equal to the minimum distance between the first deformation part 41 and the second deformation part 42, that is a=b. In some embodiments, the condition 10 µm≥a−b≥3.5 µm may be satisfied to facilitate production because of the limitation of the process. For description purposes only, the configurations of the maximum width a between the first edge 31 and the second edge e2 and the minimum b between the first edge 31 and the second edge e2 in the above embodiments are used as examples to illustrate the present disclosure and do not limit the scope of the present disclosure. In various embodiments, the configurations of the maximum width a between the first edge 31 and the second edge e2 and the minimum b between the first edge 31 and the second edge e2 may be configured according to actual needs.

Figure 10:
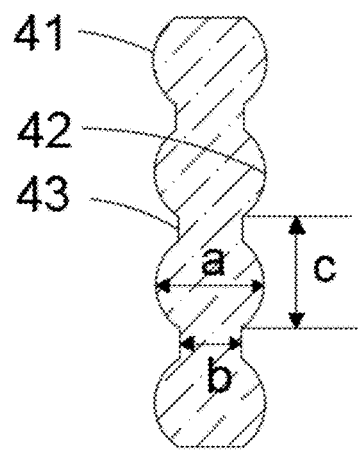
FIG. 10 illustrates a top view of another exemplary bridge electrode consistent with various disclosed embodiments in the present disclosure.

As illustrated in FIG. 10 and FIG. 12, in some embodiments, the flat parts 43 may be formed both between the adjacent first deformation parts 41 and between the adjacent second deformation parts 42. When the first deformation part 41 and the second deformation part 42 are disposed oppositely, the maximum width a between the first edge 31 and the second edge e2 may be equal to a minimum distance between two opposite flat parts 43 at the first edge 31 and the second edge e2, and the minimum width b between the first edge 31 and the second edge e2 may be equal to a minimum distance between the first deformation part 41 and the second deformation part 42 opposite to each other.

When the flat parts 43 are formed both between the adjacent first deformation parts 41 and between the adjacent second deformation parts 42, and the first deformation part 41 and the second deformation part 42 are disposed oppositely, the flat part 43 at the first edge 41 and the flat part 43 at the second edge 42 may also be opposite to each other. Specifically, when both the first deformation part 41 and the second deformation part 42 adopt a concave structure, the first deformation part 41 and the second deformation part 42 may be both recessed relative to the corresponding flat part 43. Therefore, the minimum width b between the first edge e1 and the second edge e2 may be equal to the minimum distance between the first deformation part 41 and the second deformation part 42 opposite to each other. The minimum distance between two flat parts 43 at the first edge e1 and the second edge e2 may be larger than the minimum distance between the first deformation part 41 and the second deformation part 42 opposite to each other, and the minimum distance between the two flat parts 43 may be equal to the maximum width a between the first edge e1 and the second edge, which corresponds to the case where a is larger than b.

In some embodiments, when both the first deformation part 41 and the second deformation part 42 adopt a convex structure, the first deformation part 41 and the second deformation part 42 may both protrude outward relative to the flat parts 43. Correspondingly, the maximum width a between the first edge e1 and the second edge e2 may be the minimum distance between the first deformation part 41 and the second deformation part 42 opposite to each other, and the minimum distance b between the first edge e1 and the second edge may be equal to the minimum distance between two flat parts 43 at the first edge e1 and the second edge e2.

As illustrated in FIG. 11 and FIG. 13, in one embodiment, when the flat parts 43 are formed both between the adjacent first deformation parts 41 and between the adjacent second deformation parts 42, and the first deformation part 41 and the second deformation part 42 are staggered, the maximum width a between the first edge e1 and the second edge e2 may be equal to a minimum distance between the first deformation part 41 and the flat part 43 at the second edge e2, and the minimum width b between the first edge e1 and the second edge e2 may be equal to a minimum distance between the second deformation part 42 and the flat part 43 at the first edge e1.

Figure 14:
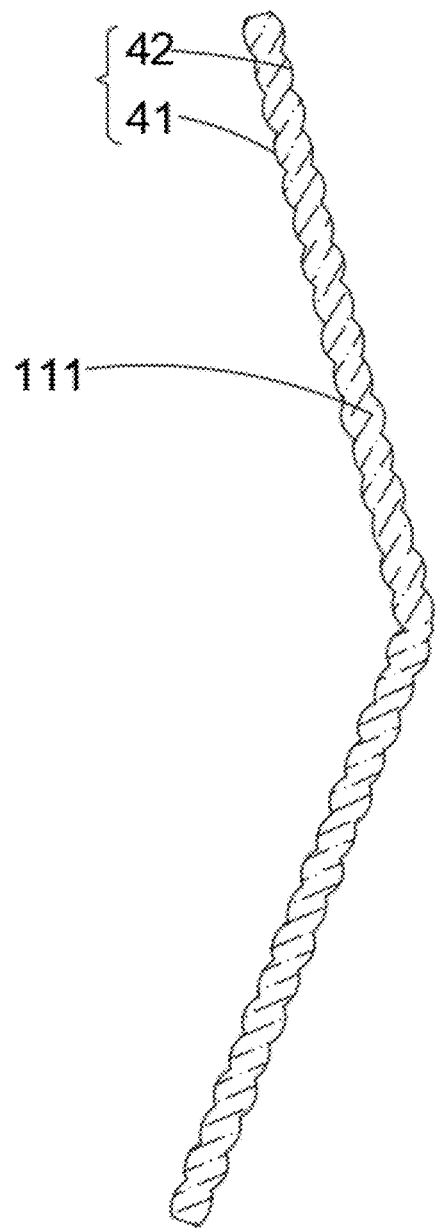
FIG. 14 illustrates a top view of another exemplary bridge electrode consistent with various disclosed embodiments in the present disclosure.
Figure 15:
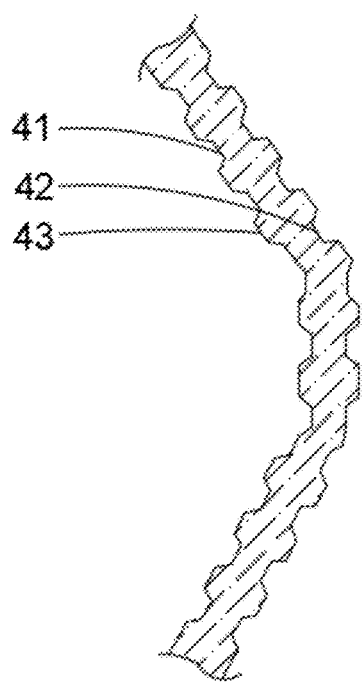
FIG. 15 illustrates a top view of another exemplary bridge electrode consistent with various disclosed embodiments in the present disclosure.

As illustrated in FIG. 5, FIG. 14, and FIG. 15, in some embodiments, an extension track of the at least one bridge electrode 111 may be at least one of a straight line, a curved line, or a broken line. It is understandable that the extension track of the at least one bridge electrode 111 needs to be selected according to the relative position of the first electrode unit to which the at least one bridge electrode 111 needs to be connected, and care should be taken to avoid other wiring. Since the deformation units may be arranged on the first edge e1 and the second edge e2 of the at least one bridge electrode 111, the extension track of the at least one bridge electrode 111 may not affect the arrangement of the deformation units 4, and the deformation units 4 may be disposed at bent positions in the extension track of the bridge electrode 111.

On the basis of the above embodiments, when the extension track of the at least one bridge electrode 111 is a multi-segment polyline, both the first deformation part 41 and the second deformation part 42 may have at least one edge with a tangent crossing an extending direction of a polyline segment where the first deformation part 41 and the second deformation part 42 are located.

It should be noted that when the extension track of the at least one bridge electrode 111 is a multi-segment polyline, different segments of the at least one bridge electrode 111 may have different extension directions. Both the first deformation part 41 and the second deformation part 42 may have at least one edge with a tangent intersecting an extending direction of a polyline segment where the first deformation part 41 and the second deformation part 42 are located while not intersecting the extension directions of other polyline segments of the at least one bridge electrode 111.

Figure 16:
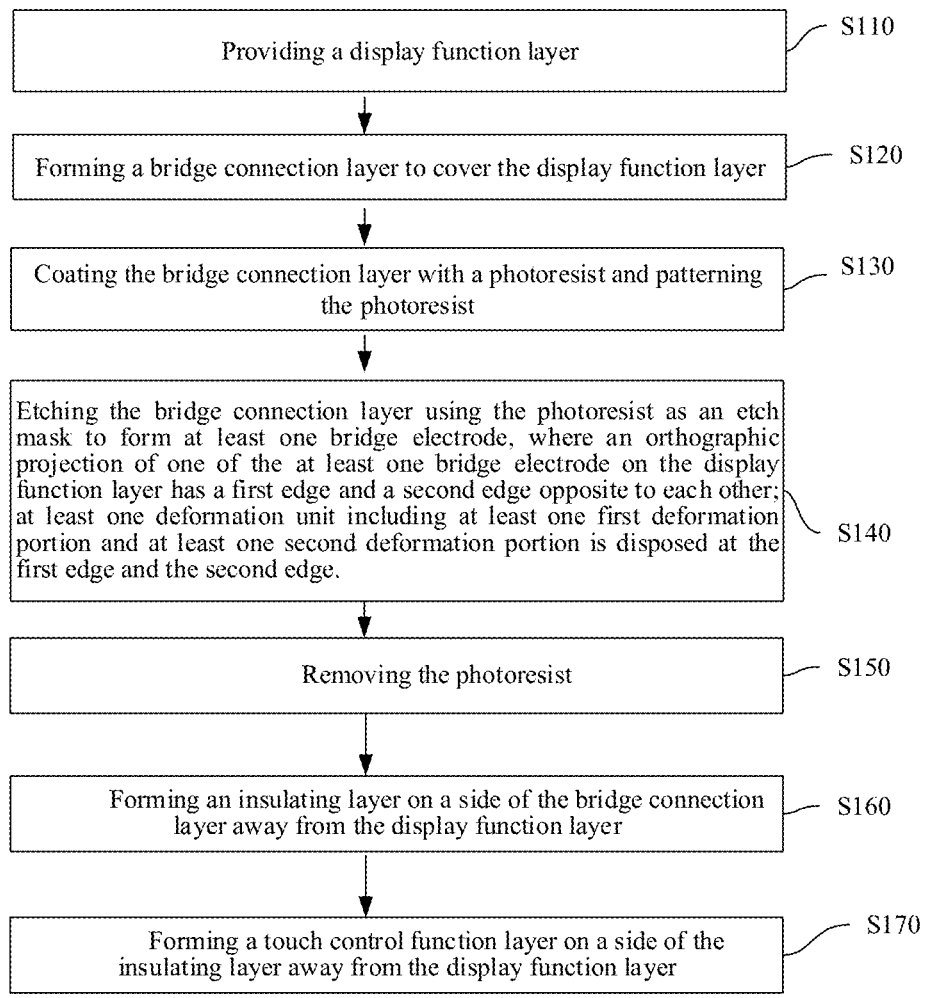
FIG. 16 illustrates an exemplary fabrication method of a display panel consistent with various disclosed embodiments in the present disclosure.
Figure 17:
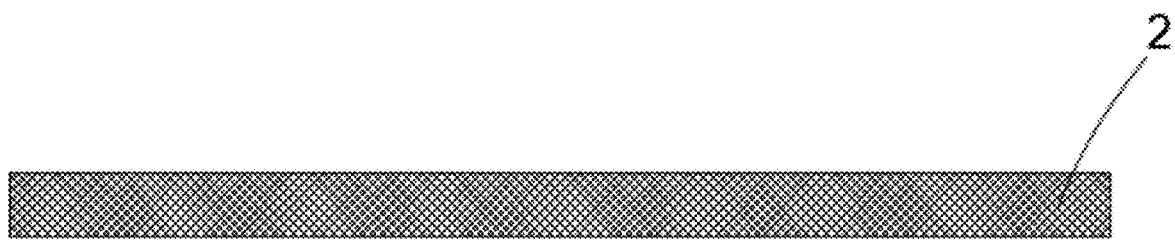
FIG. 17 illustrates a film layer structure in S110 of a fabrication method of a display panel consistent with various disclosed embodiments in the present disclosure.
Figure 18:
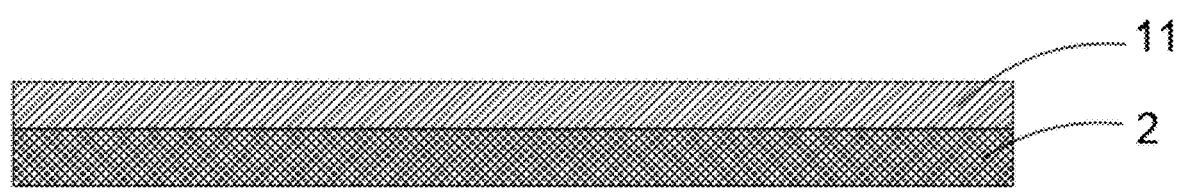
FIG. 18 illustrates a film layer structure in S120 of a fabrication method of a display panel consistent with various disclosed embodiments in the present disclosure.
Figure 19:
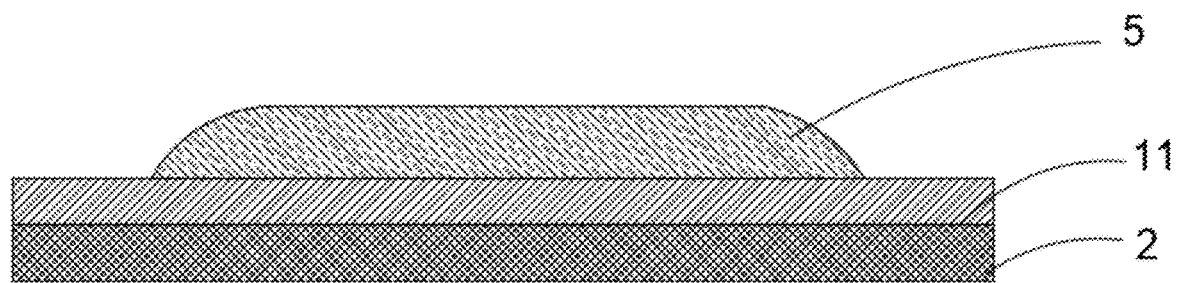
FIG. 19 illustrates a film layer structure in S130 of a fabrication method of a display panel consistent with various disclosed embodiments in the present disclosure.
Figure 20:
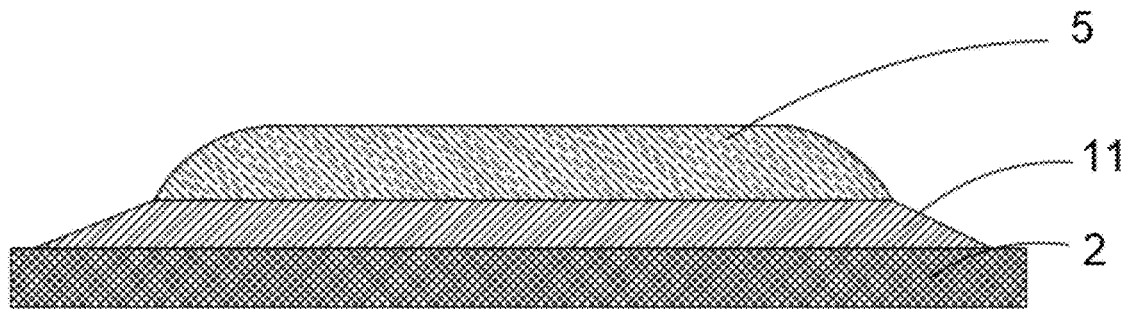
FIG. 20 illustrates a film layer structure in S140 of a fabrication method of a display panel consistent with various disclosed embodiments in the present disclosure.
Figure 21:
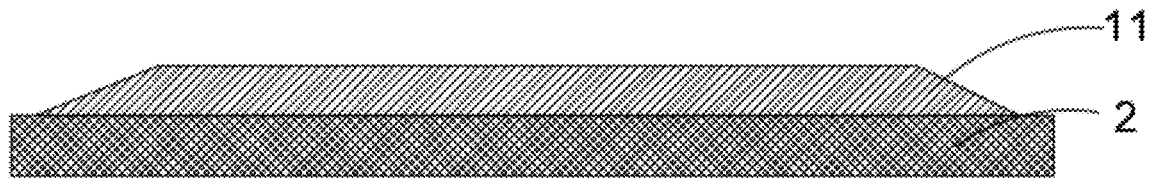
FIG. 21 illustrates a film layer structure in S150 of a fabrication method of a display panel consistent with various disclosed embodiments in the present disclosure.
Figure 22:
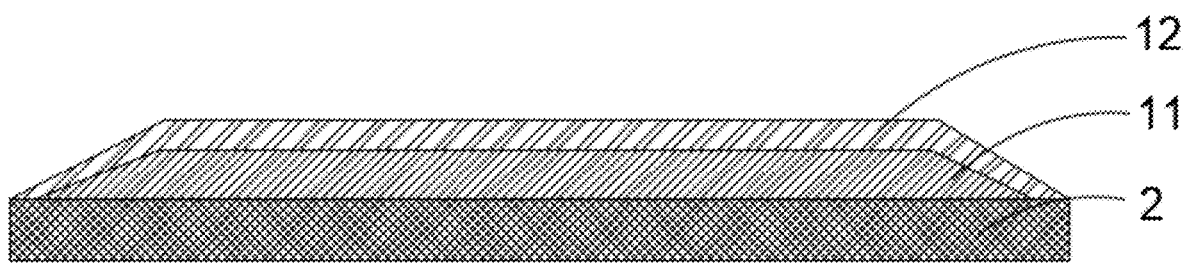
FIG. 22 illustrates a film layer structure in S160 of a fabrication method of a display panel consistent with various disclosed embodiments in the present disclosure.
Figure 23:
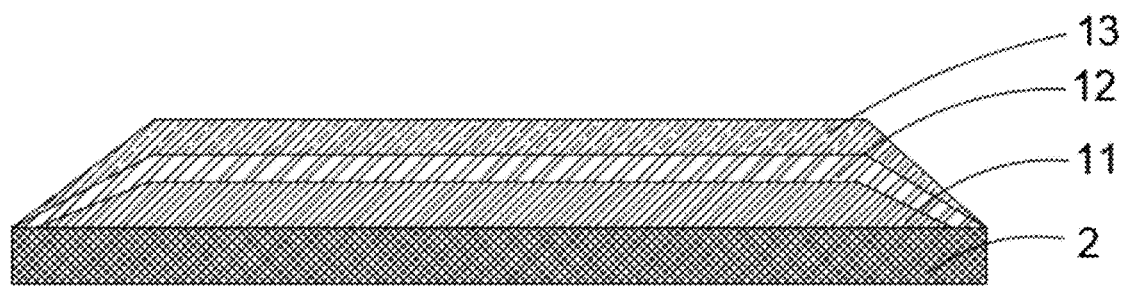
FIG. 23 illustrates a film layer structure in S170 of a fabrication method of a display panel consistent with various disclosed embodiments in the present disclosure.

The present disclosure also provides a fabrication method of a display panel. As illustrated in FIG. 16, in one embodiment, the fabrication method of a display panel may include:

S110: providing a display function layer 2 with a film layer structure in FIG. 17;

S120: forming a bridge connection layer 11 covering the display function layer 2 with a film layer structure in FIG. 18;

S130: coating the bridge connection layer 11 with a photoresist 5 and patterning the photoresist 5 to form a film layer structure in FIG. 19;

S140: etching the bridge connection layer 11 using the photoresist 5 as an etch mask to form at least one bridge electrode 11, to form a film structure in FIG. 20;

S150: removing the photoresist 5 to form a film layer structure in FIG. 21;

S160: forming an insulating layer 12 at a side of the bridge connection layer 11 away from the display function layer 2, to form a film layer structure in FIG. 22; and S170: forming a touch control electrode layer 13 a side of the insulating layer 12 away from the display function layer 2, to form a film layer structure in FIG. 23.

An orthographic projection of the at least one bridge electrode 111 on the display function layer 2 may have a first edge e1 and a second edge e2 opposite to each other. At least one deformation unit 4 may be disposed at the first edge e1 and the second edge e2. The at least one deformation unit 4 may at least include a first deformation part 41 and a second deformation part 42. The first deformation part 41 may be disposed at the first edge e1 and the second deformation part 42 may be disposed at the second edge e2. Each of the first deformation part 41 and the second deformation part 42 may have at least one edge tangent line intersecting an extending direction of the at least one bridge electrode 111.

In the fabrication method of a display panel of the present disclosure, the photoresist 5 may be patterned and the portion of the bridge connection layer 11 not covered by the photoresist 5 may be etched to form the at least one bridge electrode 11. The first edge e1 and the second edge e2 may include the deformation units 4 corresponding to the patterned photoresist 5. When forming the patterned photoresist 5, the photoresist 5 may need to be eroded in multiple directions with a developer, such that the patterned photoresist 5 can form a pattern corresponding to the at least one bridge electrode 111 with the deformation units 4 on the edges. Because of the multi-directional erosion of the developer, the edge slopes of the photoresist 5 may be more gentle. When the bridge connection layer 11 not covered by the photoresist 5 is etched, the upper part of the bridge connection layer 11 may be easier to be etched. Further, the edges of the bridge electrode 111 may need to be etched in various directions to form the first deformed portion 41 and the second deformed portion 42. The edge slopes of the at least one bridge electrode 111 formed after etching may also be more gentle, preventing the plurality of first touch control electrodes 131 and the plurality of second touch control electrodes 132 of the touch control electrode layer 13 from generating etching residues at the edge positions of the at least one bridge electrode 111 to cause a short circuit. At the same time, it can also prevent the insulating layer 12 from being broken down due to the large slope of the edges of the at least one bridge electrode 111, and then prevent the plurality of first touch control electrodes 131 and the plurality of second touch control electrodes 132 of the touch control electrode layer 13 from being damaged and broken. The uniformity of the film formation of the insulating layer 12 at the slope of the edges of the at least one bridge electrode 111, and the reliability of the display panel in the verification of electrostatic discharge may be improved.

In S110, the display function layer 2 may be an organic light-emitting diode (OLED) display panel or an active-matrix organic light-emitting diode (AMOLED) display panel. The display panel may be a flexible display panel.

In S120, the bridge connection layer 11 may be formed to cover the display function layer 2. Specifically, since the bridge connection layer 11 may be used to connect the plurality of first touch control electrodes 131 and the plurality of second touch control electrodes 132 of the touch control electrode layer 13, the bridge connection layer 11 may be made of a material with good conduction performance, including TiAlTi, or $SnInO_2$.

In S130, the photoresist 5 may be coated on the bridge connection layer 11, and then may be patterned. Photoresist can be divided into two types including negative photoresist and positive photoresist. Photoresist that forms an insoluble substance after light radiation may be a negative photoresist. Photoresist that is insoluble to some solvents and becomes soluble after light radiation may be a positive photoresist. Optionally, a positive photoresist can be used in this embodiment. The photoresist 5 may be patterned through a mask corresponding to the structure and shape of the at least one bridge electrode 111 to be formed. Specifically, patterning the photoresist 5 may include: using a patterned mask to expose part of the photoresist 5; and removing the exposed part of the photoresist 5 to form a patterned photoresist 5. First, the mask may be set above the photoresist 5, and a suitable light source may be used to illuminate the mask, such that part of the light is incident on the photoresist 5 through the mask and the photoresist 5 is exposed. Then a developer and other reagents may be used to remove the exposed part of the photoresist 5 to form a patterned photoresist 5.

It is understandable that the edge of the at least one bridge electrode 111 formed by etching the bridge connection layers 11 not covered by the photoresist 5 may have the at least one deforming unit 4. Correspondingly, the specific shape and pattern of the photoresist 5 need to be compatible with the shape of the at least one bridge electrode. Specifically, when the photoresist 5 has a recessed structure, the first deformed portion 41 and the second deformed portion 42 of the at least one deformation unit 4 correspondingly may form a convex structure matching the recessed structure. In the same way, when the photoresist 5 has a convex structure, the first deformed portion 41 and the second deformed portion 42 of the at least one deforming unit 4 may respectively form a concave structure matching the concave structure.

In some embodiments, when forming the at least one bridge electrode 111 by etching the bridge connection layers 11 not covered by the photoresist 5, the at least one bridge electrode 111 may have a trapezoidal shape on a plane along the thickness direction of the display panel, and the bottom angle α of the trapezoidal shape of the at least one bridge electrode 111 may be about 20° to 45°.

It should be noted that the cross-sectional shape of the at least one bridge electrode 111 in the thickness direction of the display panel may be a trapezoid, and specifically may be an isosceles trapezoid, which may have better stability when connected to the first electrode units and may be less prone to problems such as deformation. The bottom angle α of the at least one bridge electrode 111 may be about 20°~45°. In this embodiment, the bottom angle α of the at least one bridge electrode 111 may be the above-mentioned taper angle. The bottom angle α of the at least one bridge electrode 111 should not be too large. When the bottom angle is too large, breakdown of the insulating layer 12 on the at least one bridge electrode 111 may be easily induced.

The present disclosure also provides a display device. The display device may include any display panel provided by various embodiments of the present disclosure. The display device provided by the present disclosure may have technical effect of the technical solution in any of the foregoing embodiments, and the explanation of the structure and terms that are the same as or corresponding to the foregoing embodiments will not be repeated here. The display device provided by the present disclosure may be a mobile phone or any electronic product with display function, including but not limited to: televisions, notebook computers, desktop displays, tablet computers, digital cameras, smart bracelets, smart glasses, vehicle displays, medical equipment, industrial control equipment, or touch interactive terminals, which are not particularly limited in the present disclosure.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising a display function layer and a touch control function layer, wherein;
    the touch control function layer includes a bridge connection layer, an insulating layer, and a touch control electrode layer disposed sequentially on a light-exiting side of the display function layer;
    the bridge connection layer includes at least one bridge electrode;
    the touch control electrode layer includes a plurality of first touch control electrode strips and a plurality of second touch control electrode strips;
    the plurality of first touch control electrode strips and the plurality of second touch control electrode strips are insulated from each other;
    each of the plurality of first touch control electrode strips includes a plurality of first touch control electrodes electrically connected to each other and disposed along a first direction;
    each of the plurality of second touch control electrode strips includes a plurality of second touch control electrodes electrically connected to each other and disposed along a second direction;
    the first direction intersects the second direction;
    in a same first touch control electrode strip of the plurality of first touch control electrode strips any two adjacent first touch control electrodes of the plurality of first touch control electrodes are connected to each other through the at least one bridge electrode;
    an orthographic projection of the at least one bridge electrode on the display function layer has a first edge and a second edge opposite to each other;
    at least one deformation unit is disposed at the first edge and the second edge;
    the at least one deformation unit includes at least one first deformation part and at least one second deformation part;
    the at least one first deformation part is disposed at the first edge and the second at least one deformation part is disposed at the second edge; and
    each of the at least one first deformation part and the at least one second deformation part includes at least one edge tangent line intersecting an extending direction of the at least one bridge electrode.

2. The display panel according to claim 1, wherein:
    the at least one bridge electrode on a plane in a thickness direction of the display panel includes a trapezoid shape, and a bottom angle of the at least one bridge electrode with the trapezoid shape is about 20° to about 45°.

3. The display panel according to claim 1, wherein:
    one of the at least one first deformation part and the at least one second deformation part includes a protrusion structure, and another one of the first deformation part and the second deformation part includes a recession structure; or
    the at least one first deformation part and the at least one second deformation part both include a protrusion structure; or
    the at least one first deformation part and the at least one second deformation part both include a recession structure.

4. The display panel according to claim 3, wherein:
    the at least one first deformation part and the at least one second deformation part are disposed oppositely to each other along a direction perpendicular to the extension direction of the at least one bridge electrode; or
    the at least one first deformation part and the at least one second deformation part are disposed in a staggered manner along the direction perpendicular to the extension direction of the at least one bridge electrode.

5. The display panel according to claim 1, wherein edge shapes of orthographic projections of the at least one first deformation part and the at least one second deformation part on the touch control electrode layer are at least one of circles, polygons, arcs, or any combined patterns of circles, polygons, or arcs.

6. The display panel according to claim 5, wherein:
    an edge shape of the orthographic projections of the at least one first deformation part and the at least one second deformation part on the touch control electrode layer are same.

7. The display panel according to claim 1, wherein a flat part is disposed between two adjacent first deformation parts of the at least one first deformation part and/or between two adjacent second deformation parts of the at least one second deformation part, and an edge tangent of the flat part is parallel to the extending direction of the at least one bridge electrode.

8. The display panel according to claim 1, wherein:
    along the direction perpendicular to the extending direction of the at least one bridge electrode, a maximum width between the first edge and the second edge is a, and a minimum width between the first edge and the second edge is b, wherein a≥b.

9. The display panel according to claim 8, wherein:
    along the extending direction of the at least one bridge electrode, a length of one of the deformation units is c with 10 μm≥c≥5 μm.

10. The display panel according to claim 8, wherein:
    when a>b, the at least one first deformation part and the at least one second deformation part are disposed oppositely along the direction perpendicular to the extending direction of the at least one bridge electrode, wherein 5 µm≥a−b≥0.5 µm.

11. The display panel according to claim 8, wherein:
when a=b, the at least one first deformation part and the at least one second deformation part are disposed in a staggered manner along the direction perpendicular to the extending direction of the at least one bridge electrode, wherein 10 µm≥a−b≥3.5 µm.

12. The display panel according to claim 10, wherein:
when flat parts are disposed between two adjacent first deformation parts of the at least one first deformation part and between two adjacent second deformation parts of the at least one second deformation part, and the at least one first deformation part and the at least one second deformation part are disposed oppositely, the maximum width a between the first edge and the second edge is equal to a minimum distance between two flat parts at the first edge and the second edge opposite to each other, and the minimum width b between the first edge and the second edge is equal to a minimum distance between the at least one first deformation part and the at least one second deformation part opposite to each other.

13. The display panel according to claim 11, wherein:
when flat parts are disposed between two adjacent first deformation parts of the at least one first deformation part and between two adjacent second deformation parts of the at least one second deformation part, and the first deformation parts and the second deformation parts are disposed in a staggered manner, the maximum width a between the first edge and the second edge is equal to a minimum distance between the at least one first deformation part and the flat parts at the second edge, and the minimum width b between the first edge and the second edge is equal to a minimum distance between the at least one second deformation part and the flat parts at the first edge.

14. The display panel according to claim 1, wherein:
an extension track of the at least one bridge electrode is at least one of a straight line, a curved line, or a zigzag line.

15. The display panel according to claim 14, wherein:
when the extension track of the bridge electrode is a multi-segment zigzag line, each of the at least one first deformation part and the at least one second deformation part includes at least one edge tangent intersecting an extension direction of a segment of the zigzag line where the at least one first deformation part and the at least one second deformation part are located.

16. A display device comprising a display panel, wherein:
the display panel includes a display function layer and a touch control function layer;
the touch control function layer includes a bridge connection layer, an insulating layer, and a touch control electrode layer disposed sequentially on a light-exiting side of the display function layer;
the bridge connection layer includes at least one bridge electrode;
the touch control electrode layer includes a plurality of first touch control electrodes strips and a plurality of second touch control electrode strips;
the plurality of first touch control electrode strips and the plurality of second touch control electrode strips are insulated from each other;
each of the plurality of first touch control electrode strip includes a plurality of first touch control electrodes electrically connected to each other and disposed along a first direction;
each of the plurality of second touch control electrode strips includes a plurality of second touch control electrodes electrically connected to each other and disposed along a second direction;
the first direction intersects the second direction;
in a same first touch control electrode strip of the plurality of first touch control electrodes strips, any two adjacent first touch control electrodes of the plurality of first touch control electrodes are connected to each other through the at least one bridge electrode;
an orthographic projection of one of the at least one bridge electrode on the display function layer has a first edge and a second edge opposite to each other;
at least one deformation unit is disposed at the first edge and the second edge;
the at least one deformation unit at least includes a first deformation part and a second deformation part;
the first deformation part is disposed at the first edge and the second deformation part is disposed at the second edge; and
each of the first deformation part and the second deformation part includes at least one edge tangent line intersecting an extending direction of the at least one bridge electrode.

* * * * *